(12) United States Patent
Pellegrini et al.

(10) Patent No.: US 8,499,800 B1
(45) Date of Patent: Aug. 6, 2013

(54) ENVIRONMENTALLY PROTECTED TUBING AND METHOD OF MAKING IT

(75) Inventors: Michael J. Pellegrini, St. Charles, MO (US); Shawn P. Rowan, Glendale, MO (US); Marcus C. McCarter, Catawissa, MO (US)

(73) Assignee: O'Brien Holding Co., Inc., St. Louis, MO (US)

( * ) Notice: Subject to any disclaimer, the term of this patent is extended or adjusted under 35 U.S.C. 154(b) by 91 days.

(21) Appl. No.: 13/091,915

(22) Filed: Apr. 21, 2011

Related U.S. Application Data

(60) Provisional application No. 61/326,962, filed on Apr. 22, 2010.

(51) Int. Cl.
*F16L 9/14* (2006.01)
(52) U.S. Cl.
USPC ............... 138/140; 138/137; 138/143
(58) Field of Classification Search
USPC ............... 138/137, 140, 145, 146, 143
See application file for complete search history.

(56) References Cited

U.S. PATENT DOCUMENTS

| | | | | |
|---|---|---|---|---|
| 4,091,134 A | * | 5/1978 | Uemura et al. | 428/35.8 |
| 4,211,595 A | * | 7/1980 | Samour | 156/187 |
| 4,213,486 A | * | 7/1980 | Samour et al. | 138/143 |
| 6,650,815 B2 | * | 11/2003 | Hawtof et al. | 385/128 |
| 7,070,833 B2 | | 7/2006 | Smith et al. | |

OTHER PUBLICATIONS

O'Brien—FLATPAK—MJ—Multiple Jacketed Tubing—www.obcorp.com—2009—2 pages.
TUNGUM—Alloy Tubing—Designed to Perform—Specification and Application Guide—2011—pp. 1-20.
Shell Exploration & Production, "Gumusut / Kakap Project—Polyurethane Jacket for Offshore Stainless Steel Tubing," Feb. 26, 2007—pp. 1-11.
Chevron Energy Technology Company, Materials Selection for Offshore Instrument Tubing—5 pages.

* cited by examiner

*Primary Examiner* — Patrick F Brinson
(74) *Attorney, Agent, or Firm* — Polster, Lieder, Woodruff & Lucchesi, L.C.

(57) ABSTRACT

A highly corrosion and abrasion resistant coating combination for high precision metal tubing comprises a passivation layer applied to the tubing and a thermoplastic jacket extruded onto the passivated tubing.

16 Claims, 4 Drawing Sheets

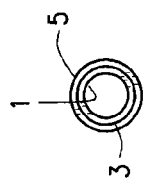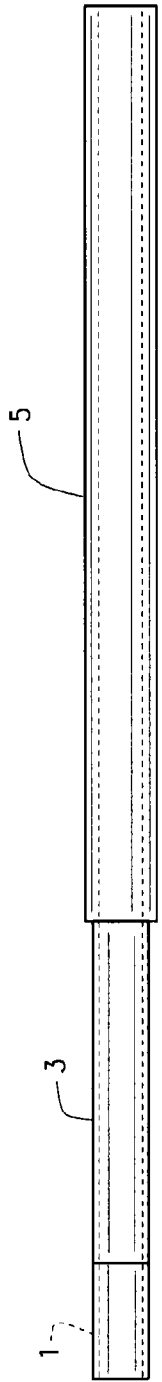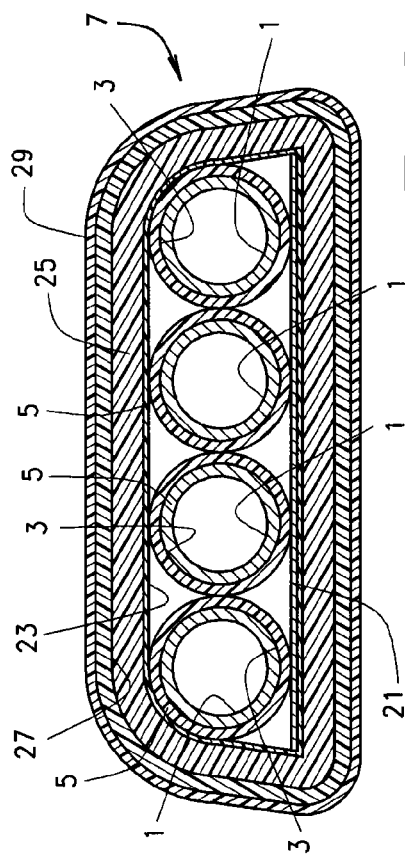

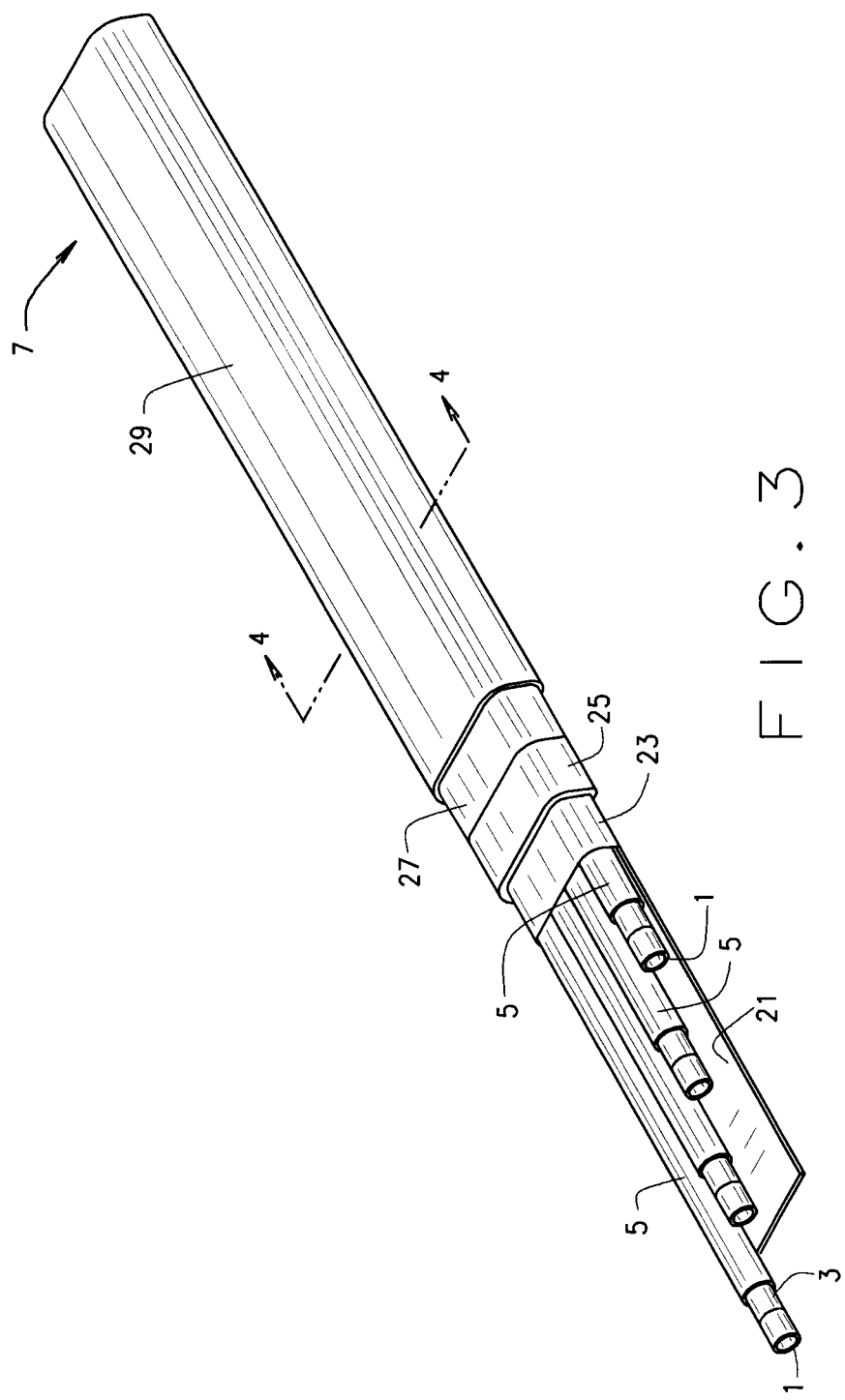

ENVIRONMENTALLY PROTECTED TUBING AND METHOD OF MAKING IT

CROSS-REFERENCE TO RELATED APPLICATIONS

Priority is claimed to U.S. Provisional Application 61/326,962, filed Apr. 22, 2010, the disclosure of which is hereby incorporated by reference.

STATEMENT REGARDING FEDERALLY SPONSORED RESEARCH

Not applicable.

BACKGROUND OF THE INVENTION

This invention relates to metal tubing, and in particular to high precision metal tubing requiring a high degree of environmental protection and methods of making such tubing. Exemplary of such tubing is O'Brien Flatpak MJ tubing.

The need for protecting metal tubing, and in particular high precision tubing used for instrumentation and control functions, from corrosion and failure in offshore/marine environments is recognized as acute. The problem is discussed, for example, in a technical paper by Chevron Energy Technology Company entitled "Materials Selection For Offshore Instrument Tubing," incorporated herein by reference. Some of the surface contaminants causing corrosion in these applications include sea water, grinding dust, weld slag and microbial agents.

Numerous attempts to increase the corrosion resistance of these tubes have been made. One approach has been to tighten the 316L metallurgy specification to require more Molybdenum content than required per ASTM A269/A213. Others have encased the tubes in impervious plastic jackets. One such attempt is described in Shell Exploration & Production, "Gumusut/Kakap Project—Polyurethane Jacket for Offshore Stainless Steel Tubing," 27 Feb. 2007, incorporated herein by reference. Despite the best efforts of many major companies, tubing failures remain a serious problem.

BRIEF SUMMARY OF THE INVENTION

Briefly stated, one aspect of the present invention is to provide a highly corrosion and abrasion resistant coating combination for high precision metal tubes. This combination has to protect against multiple forms and methods of attack. The tubing has to be protected during installation where abrasion can occur between the tube surface and tray/supports. Coiled tubing can be installed by pulling it into place using a cable winch. This method causes contact and friction between the tubing and tray/support that can lead to scratches and abrasions that can lower the corrosion resistance of the tubing. During construction, the tubing is exposed to welding slag, grinding dusts and other debris that can react with the surface of the tubing and can cause surface corrosion and cracking. An extruded thermoplastic jacket will protect the tubing during installation and construction. After installation and commissioning, the tubing will be exposed to corrosive environments including seawater, microbial and other agents.

The inventors have found that an extruded thermoplastic jacket will protect against the corrosive environments except where water ingression is possible. In general, extruded thermoplastic jackets do not adhere to the tubing. Where the jacket meets the exposed end of the tubing, capillary action appears to draw corrosive agents a short distance under the end of the jacket. In this area, corrosion may be worse than would be encountered with an unjacketed tube. An interior coating will protect against capillary action that may allow water or other liquids to travel between the jacket and tubing. This coating must form a barrier to protect the tubing. This interior coating will also protect the tubing during product preparation where the jacket is removed using knives and other tools that may scratch or nick the tubing. The outer surface of the tubing will be protected by a two step process which will include the addition of a passivation layer, preferably a silicon passivation layer applied using a vapor deposition method, and then applying a continuous thermoplastic outer jacket. The silicon passivation may be carried out using the methods of U.S. Pat. No. 7,070,833 to David A. Smith, et al, hereby incorporated by reference. Other coatings such as ceramic or zinc may work well for this application.

Another aspect of the present invention provides a method of protecting and handling the tubing during each step of manufacture. Preferably, the tubing is cleaned and passivated as by a nitric acid wash before the passivation layer is added. Special handling is most critical after the silicon passivation layer has been added but before extrusion. The silicon passivation layer is thin and can be abraded away if it contacts other metal surfaces. In a coil tubing extrusion process, the tubing is placed on a spool to allow back tension to be applied during manufacturing. In normal spooling operations the tube contacts itself and can cause abrasions. A special non-metallic spool with helical grooves should be used to ensure that the tubing wraps are separated. Any straightening rollers and centering devices should also be made of non-metallic materials to prevent scratching or abrasions.

Other aspects of the invention will be apparent to those skilled in the art in light of the following description of illustrative embodiments of the invention. It will be understood by those skilled in the art that many of the features and components of the foregoing patents and applications may be utilized in embodiments of the present invention.

BRIEF DESCRIPTION OF THE SEVERAL VIEWS OF THE DRAWINGS

In the accompanying drawings which form part of the specification:

FIGS. 1 and 2 are views in end and side elevation, respectively, showing a tube in accordance with one embodiment of the present invention.

FIGS. 3 and 4 are views in end elevation and in perspective, respectively, showing a tubing bundle in accordance with one embodiment of the present invention.

DESCRIPTION OF THE PREFERRED EMBODIMENT(S)

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 5:
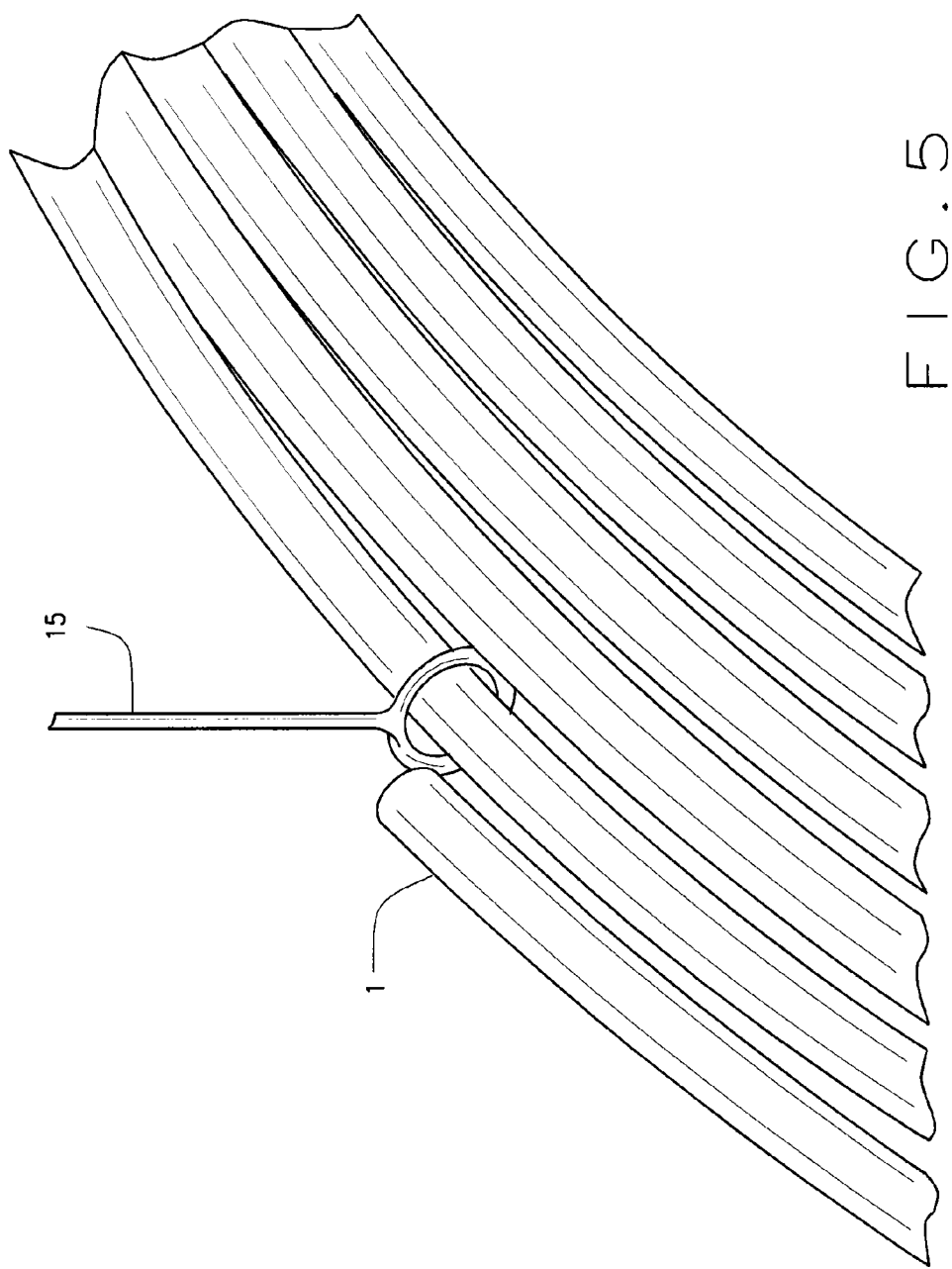
FIG. 5 is a diagrammatic view in perspective of a coiled tube of the present invention suspended by a tool in accordance with the present invention.
Figure 6:
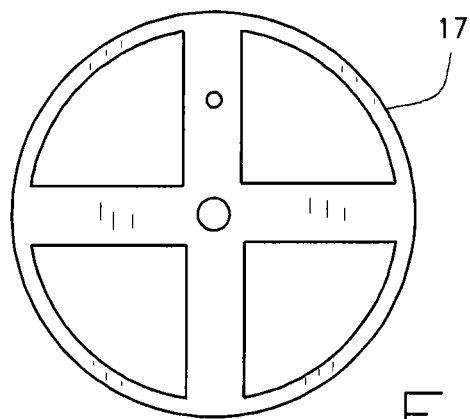
FIGS. 6, 7, and 8 are an end view, a side view, and a detail, respectively, of a coated coil spool for use in an embodiment of the present invention.
Figure 7:
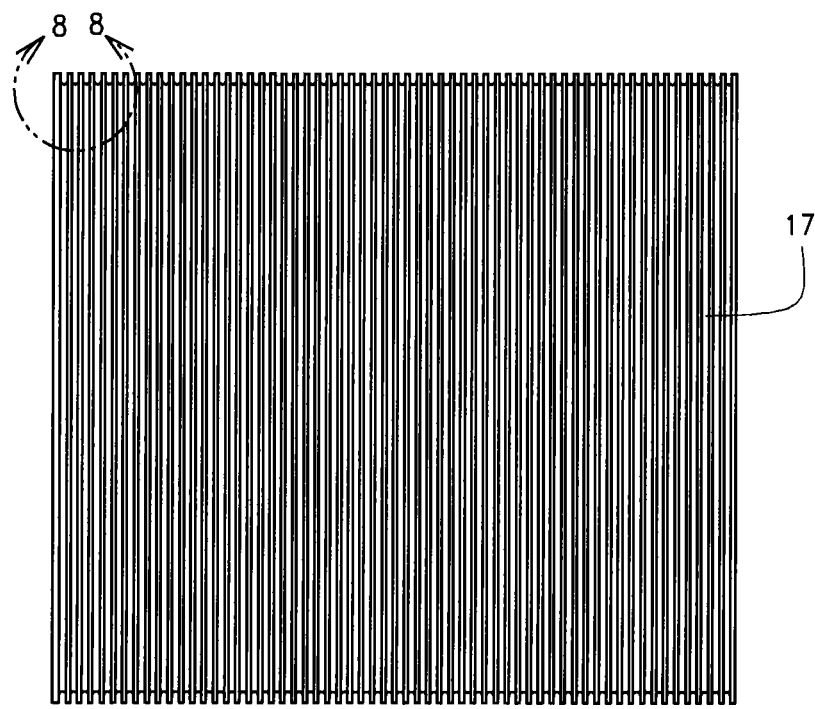
Figure 8:
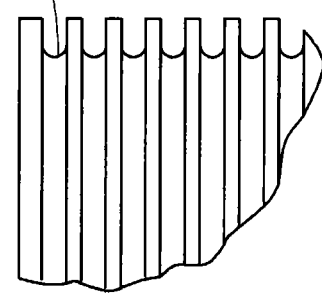

Base tubing 1 will first be passivated in a nitric acid bath for a minimum of 30 minutes and then hand wiped with clean room grade wipes to remove surface residues. The tubing 1 will then be level wound on a collapsible coiler and converted to a loose 24-inch diameter coil. The coil will then be moved into an ISO Class-7 clean room and wiped down with acetone and then capped with polyethylene caps and placed and sealed in a polyethylene bag. The material will not be removed from the bag until the coating is ready to be applied. A silicon passivation layer 3 will then be applied using a vapor deposition method like that described in the previously-mentioned U.S. Pat. No. 7,070,833 to David A. Smith, et al. The tubing wraps will need to be separated during the vapor deposition process. This will be accomplished by applying tension to the ends of the coil to keep it from collapsing or sagging. If required, wires or plastic loops 15 can be used to support the coil and moved during the operation to ensure that the outside diameter of the tubing is completely coated. After coating, the tubing wraps will be separated with plastic spacers, such as polyethylene spacers, to ensure no abrasion during transport and storage. Before extrusion, the tubing will be spooled with a traversing payout onto a plastic spool 17 made of a non-abrasive plastic such as polyethylene and having helical grooves 19, see FIGS. 6-8. All straightening rollers used to center the tubing will preferably be made of plastic or wood to ensure the tubing is not scratched. The tubing will then be extruded with a thermoplastic jacket with a nominal 0.040 inch thickness and wound on a wooden shipping spool.

The preferred thermoplastic is polyether-based thermoplastic polyurethane, although many other suitable materials are known to those skilled in the art, for example polyethylene, polytetrafluoroethylene, silicone, or thermoplastic rubber. Well-known additives such as UV stabilizers, flame retardants, colorants, and the like may of course be included in the jacket material.

The finished product will offer the customer a highly corrosion and abrasion resistant coating combination for high precision metal tubes. The coating combination will offer protection against external corrosion during construction caused by weld slag, grinding debris, blast grit and dissimilar metal contamination. It will also protect against environmental corrosion caused by salt water, salt spray and drilling mud and capillary action. The coating combination also offers mechanical protection from abrasion during installation and long term effects of vibration.

As shown in FIGS. 1 and 2, an illustrative embodiment of the tubing of the invention includes a stainless steel tube 1, having a passivation coating 3, and covered with a thermoplastic extrusion 5.

As shown in FIGS. 3 and 4, the coated and covered tube 1 may be bundled with other such tubes in a package 7 having a thermoplastic wrap. If desired, the tubing bundle may include a non-hygroscopic insulation such as a closed cell foam insulation between the tubes 1 and the thermoplastic wrap. Conveniently, the tubes 1 may be placed on an aluminum stabilizing plate 21, wrapped in a Mylar stabilizing tape 23, wrapped with a Mylar-backed closed-cell foam tape 25, and then wrapped with a second Mylar stabilizing tape 27. The tapes may be provided with pre-applied adhesive. A thermoplastic elastomeric polyurethane weatherproof jacket or wrap 29 is then extruded over the bundle.

In use, the tubes may be handled without extraordinary care, running them wherever needed and attaching them in a standard manner to valves, process equipment, fittings, and the like. Because the jacket is extruded onto the tube, it forms a friction fit with the tube rather than being bonded to it. In use, the jacket may be carefully cut and removed without scratching the underlying tube, using known techniques and tools.

Numerous variations in the device and method of the present invention will occur to those skilled in the art in view of the foregoing disclosure.

Merely by way of illustration, the tubing may be made of other types of stainless steel, or of entirely different materials, such as a Tungum® alloy, 2507, 2205, 254 SMo or other known tubing alloys. The passivation step may be carried out in different manners. The passivation and extrusion steps may be carried out in the same facility or at different facilities, with a shipping step between them.

These variations are merely illustrative.

All of the patents and printed publications mentioned herein are hereby incorporated by reference.

The invention claimed is:

1. A method of forming environmentally protected tubing comprising applying an extruded thermoplastic coating over tubing having a passivation layer thereon, the thermoplastic coating forming a friction fit with the tubing without bonding to the tubing.

2. The method of claim 1 wherein the passivation layer comprises a silicon layer on the tubing.

3. The method of claim 1 wherein the tubing is formed of stainless steel.

4. A method of forming environmentally protected tubing comprising applying an extruded thermoplastic coating over tubing having a passivation layer thereon, wherein the passivation layer comprises a silicon layer on the tubing, wherein the tubing is formed of stainless steel, and wherein the tubing is coiled and thereafter passivated.

5. The method of claim 1 comprising a step of applying the passivation layer using a vapor deposition method.

6. A method of forming environmentally protected tubing comprising applying an extruded thermoplastic coating over tubing having a passivation layer thereon, and comprising a further step of coiling the tubing on a spool having helical grooves which prevent tubing wraps from contacting each other.

7. The method of claim 6 wherein the spool is made of a non-metallic material.

8. The method of claim 1 wherein the tubing is passivated with a substance selected from the group consisting of silicon, zinc, and ceramic.

9. A method of forming environmentally protected tubing comprising applying an extruded thermoplastic coating over tubing having a passivation layer thereon, and further comprising bundling the tube with at least one other tube, and applying a thermoplastic wrap around the tubes.

10. Environmentally protected tubing comprising a metal tube, a passivation layer on the tube, and a thermoplastic layer applied to the passivation layer, the thermoplastic coating forming a friction fit with the tubing without bonding to the tubing.

11. The tubing of claim 10 wherein the passivation layer is a silicon passivation layer.

12. Environmentally protected tubing comprising a metal tube, a passivation layer on the tube, and a thermoplastic layer applied to the passivation layer, wherein the tube is bundled with at least one other tube, the bundled tubes having a wrap of thermoplastic material around them.

13. The tubing of claim 12 wherein the bundled tubing is surrounded by a non-hygroscopic insulation material.

14. The tubing of claim 13 wherein the insulation material comprises a closed cell foam insulation.

15. The method of claim 1 further comprising bundling the tube with at least one other tube, and applying a thermoplastic wrap around the tubes.

16. The tubing of claim 10 wherein the tube is bundled with at least one other tube, the bundled tubes having a wrap of thermoplastic material around them.

* * * * *